(12) United States Patent
Fuchs et al.

(10) Patent No.: US 10,365,711 B2
(45) Date of Patent: Jul. 30, 2019

(54) METHODS, SYSTEMS, AND COMPUTER READABLE MEDIA FOR UNIFIED SCENE ACQUISITION AND POSE TRACKING IN A WEARABLE DISPLAY

(71) Applicant: The University of North Carolina at Chapel Hill, Chapel Hill, NC (US)

(72) Inventors: Henry Fuchs, Chapel Hill, NC (US); Mingsong Dou, Carrboro, NC (US); Gregory Welch, Longwood, FL (US); Jan-Michael Frahm, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 14/401,833

(22) PCT Filed: May 17, 2013

(86) PCT No.: PCT/US2013/041614
§ 371 (c)(1),
(2) Date: Nov. 17, 2014

(87) PCT Pub. No.: WO2013/173728
PCT Pub. Date: Nov. 21, 2013

(65) Prior Publication Data
US 2015/0138069 A1    May 21, 2015

Related U.S. Application Data

(60) Provisional application No. 61/648,552, filed on May 17, 2012.

(51) Int. Cl.
*G06F 3/01*        (2006.01)
*G02B 27/01*       (2006.01)
(Continued)

(52) U.S. Cl.
CPC .......... *G06F 3/012* (2013.01); *G02B 27/0093* (2013.01); *G02B 27/017* (2013.01);
(Continued)

(58) Field of Classification Search
CPC ........... G06F 3/011; G06F 3/012; G06F 3/017
See application file for complete search history.

(56) References Cited

U.S. PATENT DOCUMENTS 6,503,195 B1    1/2003  Keller et al.
7,453,514 B2   11/2008  Furlan et al.
(Continued)

FOREIGN PATENT DOCUMENTS

KR  10-2005-0082348   8/2005
KR  10-2009-0047889   5/2009
(Continued)

OTHER PUBLICATIONS

Notification of Transmittal of the International Search Report and the Written Opinion of the International Searching Authority, or the Declaration for International Application No. PCT/US2013/041614 (dated Aug. 27, 2013).
(Continued)

*Primary Examiner* — Alexander Eisen
*Assistant Examiner* — Cory A Almeida
(74) *Attorney, Agent, or Firm* — Jenkins, Wilson, Taylor & Hunt, P.A.

(57) ABSTRACT

Methods, systems, and computer readable media for unified scene acquisition and pose tracking in a wearable display are disclosed. According to one aspect, a system for unified scene acquisition and pose tracking in a wearable display includes a wearable frame configured to be worn by a user. Mounted on the frame are: at least one sensor for acquiring scene information for a real scene proximate to the user, the scene information including images and depth information;
(Continued)

a pose tracker for estimating the user's head pose based on the acquired scene information; a rendering unit for generating a virtual reality (VR) image based on the acquired scene information and estimated head pose; and at least one display for displaying to the user a combination of the generated VR image and the scene proximate to the user.

37 Claims, 10 Drawing Sheets

(51) Int. Cl.
  *G02B 27/00* (2006.01)
  *G06T 17/00* (2006.01)
(52) U.S. Cl.
  CPC .............. *G06F 3/011* (2013.01); *G06F 3/017* (2013.01); *G06T 17/00* (2013.01); *G02B 2027/0178* (2013.01); *G02B 2027/0187* (2013.01)

(56) References Cited

U.S. PATENT DOCUMENTS

| | | | |
|---|---|---|---|
| 8,617,058 B2 | 12/2013 | Arneson | |
| 9,898,866 B2 | 2/2018 | Fuchs et al. | |
| 10,074,031 B2 | 9/2018 | Krenzer et al. | |
| 2002/0118861 A1* | 8/2002 | Jouppi | G06F 3/012 382/103 |
| 2005/0083248 A1 | 4/2005 | Biocca et al. | |
| 2005/0168403 A1 | 8/2005 | Ebersole, Jr. et al. | |
| 2006/0161572 A1* | 7/2006 | Vogt | G06T 13/20 |
| 2009/0185715 A1 | 7/2009 | Hofhauser et al. | |
| 2009/0213037 A1 | 8/2009 | Schon | |
| 2010/0053325 A1 | 3/2010 | Inagaki | |
| 2010/0253859 A1 | 10/2010 | Hall, Jr. | |
| 2011/0018903 A1 | 1/2011 | Lapstun et al. | |
| 2011/0211082 A1 | 9/2011 | Forssén et al. | |
| 2012/0062702 A1 | 3/2012 | Jiang et al. | |
| 2012/0093365 A1 | 4/2012 | Aragane et al. | |
| 2012/0098926 A1 | 4/2012 | Kweon | |
| 2012/0105473 A1* | 5/2012 | Bar-Zeev | G02B 27/017 345/633 |
| 2012/0113092 A1* | 5/2012 | Bar-Zeev | G02B 27/017 345/419 |
| 2012/0119978 A1 | 5/2012 | Border et al. | |
| 2012/0192088 A1* | 7/2012 | Sauriol | G06F 3/011 715/757 |
| 2012/0307075 A1 | 12/2012 | Margalit | |
| 2012/0320224 A1 | 12/2012 | Miyoshi et al. | |
| 2013/0201291 A1* | 8/2013 | Liu | G06F 3/012 348/47 |
| 2014/0118496 A1 | 5/2014 | Calakli et al. | |
| 2015/0369609 A1 | 12/2015 | Roumeliotis et al. | |
| 2016/0035139 A1 | 2/2016 | Fuchs et al. | |
| 2017/0018086 A1 | 1/2017 | Zhang | |
| 2017/0026599 A1 | 1/2017 | He et al. | |
| 2017/0032214 A1 | 2/2017 | Krenzer et al. | |
| 2017/0345398 A1 | 11/2017 | Fuchs et al. | |
| 2018/0053284 A1 | 2/2018 | Rodriguez et al. | |
| 2018/0054575 A1 | 2/2018 | Pawlowicz et al. | |
| 2018/0068462 A1 | 3/2018 | Wakai et al. | |
| 2018/0157946 A1 | 6/2018 | Landry et al. | |
| 2018/0173963 A1 | 6/2018 | Taylor | |
| 2019/0096043 A1 | 3/2019 | Ma et al. | |

FOREIGN PATENT DOCUMENTS

| | | |
|---|---|---|
| WO | WO 2004/012141 A1 | 2/2004 |
| WO | WO 2014/160342 A1 | 10/2014 |
| WO | WO 2016/073557 A1 | 5/2016 |

OTHER PUBLICATIONS

Kelshikar et al., "Real-time Terascale Implementation of Tele-immersion," Computational Science—ICCS 2003, vol. 2660, pp. 33-42 (Jun. 2003).

Notification of Transmittal of the International Search Report and the Written Opinion of the International Searching Authority, or the Declaration for International Application No. PCT/US2014/026349 (dated Jul. 28, 2014).

Yang et al., "Differential camera tracking through linearizing the local appearance manifold," IEEE Conference on CVPR'07, pp. 1-8 (2007).

Pollefeys et al., "Visual modeling with a hand-held camera," International Journal of Computer Vision, vol. 59, No. 3, pp. 207-232 (2004).

Bishop, "Self-Tracker: A Smart Optical Sensor on Silicon," Dissertation, http://www.cs.unc.edu/~gb/Pubs/SelfTracker.pdf, pp. 1-65 (1984).

"HCC: CGV: Small: Just-in-Time Tracking and Display for Matching Real and Virtual Worlds in Head-Worn Displays," pp. 1-19 (Publication Date Unknown).

Maimone et al., "General-purpose telepresence with head-worn optical see-through displays and projector-based lighting," To appear in: IEEE Virtual Reality 2013, (Mar. 2013).

Pool et al., "Lossless compression of variable-precision floating-point buffers on GPUs," Proc. Symposium on Interactive 3D Graphics (I3D), (Mar. 9-11, 2012).

Jerald et al., "Scene-motion thresholds during head yaw for immersive virtual environments," ACM Transactions on Applied Perception (TAP), vol. 9, No. 1 p. 4, (2012).

Maimone et al., "A first look at a telepresence system with room-sized real-time 3d capture and life-sized tracked display wall," 2011 21st International Conference on Artificial Reality and Telexistence (ICAT), (Nov. 2011).

Maimone et al., "Encumbrance-free telepresence system with real-time 3d capture and display using commodity depth cameras," 2011 10th IEEE International Symposium on Mixed and Augmented Reality (ISMAR), (Oct. 2011).

Pool et al., "Precision selection for energy-efficient pixel shaders," Proc. High Performance Graphics, ACM, (Aug. 5-7, 2011).

Pool et al., "Power-gated arithmetic circuits for energy-precision tradeoffs in mobile graphics processing units," Journal of Low-Power Electronics (JOLPE), vol. 7, No. 2, pp. 148-162, (2011).

Ye et al., "A Practical Multi-Viewer Tabletop Autostereoscopic Display," 2010 9th IEEE International Symposium on Mixed and Augmented Reality (ISMAR), pp. 147-156, (Oct. 2010).

Pool et al., "An energy model for graphics processing units," 2010 IEEE International Conference on Computer Design (ICCD), pp. 409-416, (Oct. 2010).

Newcombe et al., "Live dense reconstruction with a single moving camera," 2010 IEEE Conference on Computer Vision and Pattern Recognition (CVPR), pp. 1498-1505, IEEE, (2010).

Clipp et al., "Parallel, real-time visual slam," 2010 IEEE/RSJ International Conference on Intelligent Robots and Systems (IROS), pp. 3961-3968. IEEE, (2010).

Asteriadis et al., "Head pose estimation with one camera, in uncalibrated environments," Proceedings of the 2010 workshop on Eye gaze in intelligent human machine interaction, EGIHMI '10, pp. 55-62, New York, NY, USA (2010).

Parker et al., "Optix: A general purpose ray tracing engine," ACM Transactions on Graphics, (Aug. 2010).

Baker et al., "Removing rolling shutter wobble," Computer Vision and Pattern Recognition (CVPR), 2010 IEEE Conference, pp. 2392-2399, (Jun. 2010).

Forsse et al., "Rectifying rolling shutter video from hand-held devices," 2010 IEEE Conference on Computer Vision and Pattern Recognition (CVPR), pp. 507-514, (Jun. 2010).

Jinwei Gu et al., "Coded rolling shutter photography: Flexible space-time sampling," 2010 IEEE International Conference on Computational Photography (ICCP), pp. 1-8, (Mar. 2010).

Lincoln et al., "Multi-view lenticular display for group teleconferencing," Proceedings of the 2nd International Conference on Immersive Telecommunications, IMMERSCOM '09, pp. 22:1-22:8, ICST,

(56) References Cited

OTHER PUBLICATIONS

Brussels, Belgium, Belgium, Institute for Computer Sciences, Social-Informatics and Telecommunications Engineering, (2009).
Lincoln et al., "Animatronic shader lamps avatars," Proceedings of the 2009 8th IEEE International Symposium on Mixed and Augmented Reality, ISMAR '09, pp. 27-33, Washington, DC, USA, IEEE Computer Society, (2009).
Nashel et al., "Random hole display: A non-uniform barrier autostereoscopic display," 3DTV Conference: The True Vision—Capture, Transmission and Display of 3D Video, 2009, pp. 1-4, (May 2009).
Jerald et al., "Sensitivity to scene motion for phases of head yaws," Proceedings of the 5th symposium on Applied perception in graphics and visualization, pp. 155-162, ACM, (2008).
Pool et al., "Energy-precision tradeoffs in mobile graphics processing units," Proc. Int. Conf. Computer Design (ICCD), p. 6067, (2008).
Steinhurst et al., "Reducing Photon Mapping Bandwidth By Query Reordering," IEEE Transactions on Visualization and Computer Graphics, vol. 14, No. 1, pp. 13-24, (2008).
Raguram et al., "A comparative analysis of RANSAC techniques leading to adaptive real-time random sample consensus," Computer Vision—ECCV 2008, pp. 500-513, (2008).
Pollefeys et al., "Detailed real-time urban 3d reconstruction from video," International Journal of Computer Vision, vol. 78, No. 2, pp. 143-167, (2008).
Coombe, "Practical Surface Light Fields," Phd Dissertation, (2007).
Davison et al., "Monoslam: Real-time single camera slam," IEEE Transactions on Pattern Analysis and Machine Intelligence, vol. 29, No. 6, pp. 1052-1067, (2007).
Yang et al., "Differential Camera Tracking Through Linearizing the Local Appearance Manifold," IEEE Conference on Computer Vision and Pattern Recognition (CVPR'07), pp. 1-8, IEEE, (2007).
Steinhurst et al., "Practical Photon Mapping in Hardware," PhD Dissertation, (2007).
Hensley et al., "Increasing Rendering Performance of Graphics Hardware," PhD dissertation, (2007).
Horn et al., "Interactive k-d tree GPU raytracing," Proceedings of the 2007 symposium on Interactive 3D graphics and games, I3D '07, pp. 167-174, New York, NY, USA, ACM, (2007).
Coombe et al., "An incremental weighted least squares approach to surface lights fields," GRAPP International Conference on Computer Graphics Theory and Applications, pp. 84-91, (2006).
Steinhurst et al., "Global Importance Sampling of Glossy Surfaces Using the Photon Map," IEEE Symposium on Interactive Ray Tracing, (2006).
State et al., "Simulation-Based Design and Rapid Prototyping of a Parallax-Free, Orthoscopic Video See-Through Head-Mounted Display," Proceedings of the Fourth IEEE and ACM International Symposium on Mixed and Augmented Reality, pp. 28-31, (Oct. 2005).
Steinhurst et al., "Reordering for Cache Conscious Photon Mapping," Proceedings of Graphics Interface, (2005).
Elgammal, "Learning to track: Conceptual manifold map for closed-form tracking," Proceedings of the 2005 IEEE Computer Society Conference on Computer Vision and Pattern Recognition (CVPR'05), vol. 1, CVPR '05, pp. 724-730, Washington, DC, USA, IEEE Computer Society, (2005).
Coombe et al., "Online construction of surface light fields," EGSR, (2005).
Hensley et al., "Fast summed-area table generation and its applications," Proceedings of Eurographics 2005 and Computer Graphics Forum, (2005).
Hensley et al., "A fast, energy-efficient z-comparator," Proceedings of Graphics Hardware, pp. 41-44, 2005.
Hensley et al., "A scalable counterflow-pipelined asynchronous radix-4 booth multiplier," Proceedings of the 11th IEEE International Symposium on Computer Design, IEEE Computer Society, (2005).
Nakamura, "Image sensors and Signal Processing for Digital Still Cameras," CRC Press, Inc., Boca Raton, FL, USA, (2005).
Muehlmann et al., "A new high speed CMOS camera for real-time tracking applications," Proceedings of the 2004 IEEE International Conference on Robotics and Automation (ICRA '04), vol. 5, pp. 5195-5200, (Apr.-May 1, 2004).
Coombe et al., "Radiosity on graphics hardware," Proceedings of Graphics Interface, (2004).
Hensley et al., "An area- and energy-efficient asynchronous booth multiplier for mobile devices," Proc. Int. Conf. Computer Design (ICCD), pp. 18-25, (2004).
Adelstein et al., "Head tracking latency in virtual environments: psychophysics and a model," Proceedings of the Human Factors and Ergonomics Society Annual Meeting, vol. 47, pp. 2083-2087, SAGE Publications, (2003).
Davison, "Real-time simultaneous localisation and mapping with a single camera," Proceedings of the Ninth IEEE International Conference on Computer Vision, pp. 1403-1410, IEEE, (2003).
Harris, "Real-Time Cloud Simulation and Rendering," PhD Dissertation (available as technical report #tr03-040), (2003).
Harris et al., "Simulation of cloud dynamics on graphics hardware," Proceedings of Graphics Hardware, (2003).
Harris et al., "Physically-based visual simulation on graphics hardware," SIGGRAPH / Eurographics Workshop on Graphics Hardware, (2002).
Comaniciu et al., "Mean shift: A robust approach toward feature space analysis," IEEE Trans. Pattern Anal. Mach. Intell., vol. 24, No. 5, pp. 603-619, (May 2002).
Ellis et al., "Three dimensional tracking in augmented environments: user performance trade-offs between system latency and update rate," Proceedings of the Human Factors and Ergonomics Society annual meeting, vol. 46, pp. 2149-2153, SAGE Publications, (2002).
Rolland et al., "Optical versus video see-through head-mounted displays," Medical Visualization, Presence: Teleoperators and Virtual Environments, pp. 287-309, (2000).
Gabbard et al., "User-centered design and evaluation of virtual environments," Computer Graphics and Applications, IEEE, vol. 19, No. 6, pp. 51-59, (1999).
Pollefeys et al., "Self-calibration and metric reconstruction inspite of varying and unknown intrinsic camera parameters," International Journal of Computer Vision, vol. 32, No. 1, pp. 7-25, (1999).
Belhumeur et al., "What is the set of images of an object under all possible illumination conditions?," Int. J. Comput. Vision, vol. 28, No. 3, pp. 245-260, (Jul. 1998).
Fuchs et al., "Augmented reality visualization for laparoscopic surgery," Proceedings of the First International Conference on Medical Image Computing and Computer-Assisted Intervention, pp. 934-943, Springer-Verlag, (1998).
Hager et al., "Efficient region tracking with parametric models of geometry and illumination," IEEE Transactions on Pattern Analysis and Machine Intelligence, vol. 20, No. 10, pp. 1025-1039, (Oct. 1998).
Mark et al., "Post-rendering 3d warping," Proceedings of the 1997 symposium on Interactive 3D graphics, I3D '97, pp. 7-16, New York, NY, USA, ACM (1997).
Feiner et al., "A touring machine: Prototyping 3d mobile augmented reality systems for exploring the urban environment," Proceedings of the 1st IEEE International Symposium on Wearable Computers, ISWC '97, pp. 74-, Washington, DC, USA, IEEE Computer Society, (1997).
Jacobs et al., "Managing latency in complex augmented reality systems," Proceedings of the 1997 symposium on Interactive 3D graphics, I3D '97, pp. 49-ff., New York, NY, USA, ACM, (1997).
Fossum "Cmos image sensors: electronic camera on a chip," International Electron Devices Meeting, 1995, IEDM '95, pp. 17-25, (Dec. 1995).
Olano et al., "Combatting rendering latency," Proceedings of the 1995 symposium on Interactive, I3D graphics, I3D '95, New York, NY, USA, ACM, (1995).
Murase et al., "Visual learning and recognition of 3-d objects from appearance," Int. J. Comput. Vision, vol. 14, No. 1, pp. 5-24, (Jan. 1995).

(56) References Cited

OTHER PUBLICATIONS

Kelley et al., "Hardware accelerated rendering of csg and transparency," Proceedings of the 21st annual conference on Computer graphics and interactive techniques, SIGGRAPH '94, pp. 177-184, New York, NY, USA, ACM, (1994).
Neumann et al., "A vision of telepresence for medical consultations and other applications," Proceedings of the Sixth International Symposium on Robotics Research, pp. 565-571, (Oct. 1993).
Feiner et al., "Knowledge-based augmented reality," Commun. ACM, vol. 36, No. 7, pp. 53-62, (Jul. 1993).
Heeger et al., "Subspace methods for recovering rigid motion i: Algorithm and implementation," International Journal of Computer Vision, vol. 7, pp. 95-117, (1992).
Caudell et al., "Augmented reality: an application of heads-up display technology to manual manufacturing processes," Proceedings of the Twenty-Fifth Hawaii International Conference on System Sciences, vol. 2, pp. 659-669 (Jan. 1992).
Hanna, "Direct multi-resolution estimation of ego-motion and structure from motion," Proceedings of the IEEE Workshop on Visual Motion, pp. 156-162, (Oct. 1991).
Deering et al., "The triangle processor and normal vector shader: a VLSI system for high performance graphics," Proceedings of the 15th annual conference on Computer graphics and interactive techniques, SIGGRAPH '88, pp. 21-30, New York, NY, USA, ACM, (1988).
Niimi et al., "A parallel processor system for three-dimensional color graphics," SIGGRAPH Comput. Graph., vol. 18, No. 3, pp. 67-76, (Jan. 1984).
Fischler et al., "Random sample consensus: a paradigm for model fitting with applications to image analysis and automated cartography," Commun. ACM, vol. 24, No. 6, pp. 381-395, (Jun. 1981).
Watkins, "A real time visible surface algorithm," PhD Thesis, Order No. AAI7023061, (1970).
DLP Discovery 4100 Development Kit, http://www.ti.com/tool/dlpd4x00kit, pp. 1-4 (Jan. 2014).
Dou et al., "Scanning and Tracking Dynamic Objects with Commodity Depth Cameras," Mixed and Augmented Reality (ISMAR), 2013 IEEE International Symposium, pp. 1-8 (2013).
Fuchs, "Augmenting reality for medicine, training, presence, and telepresence," Proceedings IEEE International Symposium on Mixed and Augmented Reality (ISMAR 2010), 1 page, (2010).
Gu et al., "Coded Rolling Shutter Photography: Flexible Space-Time Sampling," Computational Photography (ICCP), 2010 IEEE International Conference, pp. 1-8 (Mar. 2010).
Jones et al., "Achieving Eye Contact in a One-to-Many 3D Video Teleconferencing System," ACM Transactions on Graphics, 28(3), pp. 1-8 (Jul. 2009).
Maimone et al., "Computational augmented reality eyeglasses," Mixed Augmented Reality (ISMAR), 2013 IEEE International Symposium, pp. 1-10 (2013).
Notification of Transmittal of the International Search Report and the Written Opinion of the International Searching Authority, or the Declaration for International Application No. PCT/US2015/058959 (dated Mar. 3, 2016).
Pasman et al., "Accurate overlaying for mobile augmented reality," Preprint for Computers&Graphis, 23(6), pp. 875-881 (7 pages) (1999).
Non-Final Office Action for U.S. Appl. No. 14/776,244 (dated May 18, 2017).
Hedborg et al., "Structure and Motion Estimation from Rolling Shutter Video," IEEE International Conference on Computer Vision Workshops, pp. 17-23 (2011).
Non-Final Office Action for U.S. Appl. No. 15/522,765 (dated Nov. 15, 2018).
Non-Final Office Action for U.S. Appl. No. 16/008,682 (dated Oct. 5, 2018).
Bapat et al., "Rolling Shutter and Radial Distortion are Features for High Frame Rate Multi-Camera Tracking," Department of Computer Science, The University of North Carolina at Chapel Hill, pp. 1-10 (publication date unknown).
Geyer et al., "Geometric Models of Rolling-Shutter Cameras," EECS Department, University of California, Berkeley, pp. 1-8 (publication date unknown).
Kim et al., "Rrd-Slam: Radial-Distorted Rolling-Shutter Direct Slam," Robotics and Automation (ICRA), pp. 5148-5154 (2017).
Albl et al., "Degeneracies in Rolling Shutter SFM," European Conference on Computer Vision, pp. 36-51 (2016).
Bapat et al., "Towards Kilo-Hertz 6-DOF Visual Tracking Using an Egocentric Cluster of Rolling Shutter Cameras," IEEE Transactions on Visualization and Computer Graphics, vol. 22, No. 11, pp. 2358-2367 (2016).
Dai et al., "Rolling Shutter Camera Relative Pose: Generalized Epipolar Geometry," The IEEE Conference on Computer Vision and Pattern Recognition (CVPR), pp. 1-11 (2016).
Kim et al., "Direct Semi-Dense Slam for Rolling Shutter Cameras," School of Computer Science, University of Adelaide, Australia, pp. 1-8 (2016).
Lincoln et al., "From Motion to Photons in 80 Microseconds: Toward Minimal Latency for Virtual and Augmented Reality," IEEE Transactions on Visualization and Computer Graphics, vol. 22, No. 4, pp. 1367-1376 (2016).
Rengarajan et al., "From Bows to Arrows: Rolling Shutter Rectification of Urban Scences," Proceedings of the IEEE Conference on Computer Vision and Pattern Recognition, pp. 2773-2781 (2016).
Saurer et al., "Sparse to Dense 3d Reconstruction from Rolling Shutter Images," IEEE Computer Vision and Pattern Recognition, pp. 1-9 (2016).
Albl et al., "R6p-Rolling Shutter Absolute Camera Pose," Proceedings of the IEEE Conference on Computer Vision and Pattern Recognition, pp. 2292-2300 (2015).
Kerl et al., "Dense Continuous-Time Tracking and Mapping with Rolling Shutter RGB-D Cameras," Proceedings of the IEEE International Conference on Computer Vision, pp. 2264-2272 (2015).
Patron-Perez et al., "A Spline-Based Trajectory Representation for Sensor Fusion and Rolling Shutter Cameras," International Journal of Computer Vision, vol. 113, No. 3, pp. 208-219 (2015).
Saurer et al., "A Minimal Solution to the Rolling Shutter Pose Estmation Problem," Intelligent Robots and Systems (IROS), pp. 1328-1334 (2015).
Engel et al., "LSD-SLAM, General Notes on Good Results," https://github.com/tum-vision/lsd_slam#316-general-notes-for-good-results, pp. 1-7 (2014).
Engel et al., "LSD SLAM: Large-Scale Direct Monocular Slam," European Conference on Computer Vision, Springer, pp. 834-849 (2014).
LaValle et al., "Head Tracking for the Oculus Rift," Robotics and Automation (ICRA), pp. 187-194 (2014).
Zheng et al., Minimizing Latency for Augmented Reality Displays: Frames Considered Harmful, International Symposium on Mixed and Augmented Reality (ISMAR), pp. 195-200 (2014).
Oth et al., "Rolling Shutter Camera Calibration," Proceedings of the IEEE Conference on Computer Vision and Pattern Recognition, pp. 1360-1367 (2013).
Saurer et al., "Rolling Shutter Stereo," Proceedings of the IEEE Intl. Conference on Computer Vision, pp. 465-472 (2013).
Dou et al., "Exploring High-Level Plane Primitives for Indoor 3d Reconstruction with a Hand-Held RGB-D Camera," Asian Conference on Computer Vision, Springer, pp. 94-108 (2012).
Grundmann et al., "Effective Calibration Free Rolling Shutter Removal," http://www.cc.gatech.edu/cpl/projects/rollingshutter, pp. 1-8 (2012).
Handa et al., "Real-Time Camera Tracking: When is High Frame-Rate Best?" European Conference on Computer Vision, Spring, pp. 222-235 (2012).
Hedborg et al., "Rolling Shutter Bundle Adjustment," Computer Vision and Pattern Recognition (CVPR), pp. 1434-1441 (2012).
Magerand et al., "Global Optimization of Object Pose and Motion from a Single Rolling Shutter Image with Automatic 2d-3d Matching," European Conference on Computer Vision, Springer, pp. 456-469 (2012).
Liu et al., "Subspace Video Stabilization," ACM Transactions on Graphics (TOG), vol. 30, No. 1, pp. 1-4 (2011).

(56) References Cited

OTHER PUBLICATIONS

Forssen et al., "Rectifying Rolling Shutter Video from Hand-Held Devices," Computer Vision and Pattern Recognition (CVPR), pp. 507-514 (2010).
Gelper et al., "Robust Forecasting with Exponential and Holt-Winters Smoothing," Journal of Forecasting, vol. 29, No. 3, pp. 1-22 (2010).
Bradley et al., "Synchronization and Rolling Shutter Compensation for Consumer Video Camera Arrays," Computer Vision and Pattern Recognition Workshops, 2009. CVPR Workshops 2009. IEEE Computer Society Conference, pp. 1-8 (2009).
Ait-Adler et al., "Kinematics from Lines in a Single Rolling Shutter Image," Computer Vision and Pattern Recognition, 2007, pp. 1-6 (2007).
Ait-Aider et al., "Exploiting Rolling Shutter Distortions for Simultaneous Object Pose and Velocity Computation Using a Single View," Computer Vision Systems, 2006 ICVS'06, pp. 1-7 (2006).
Sanchez-Vives et al., "From Presence Toward Consciousness," 8th Annual Conference for the Scientific Study of Consciousness, pp. 1-34 (2004).
Zhang, "A Flexible New Technique for Camera Calibration," IEEE Transactions on Pattern Analysis and Machine Intelligence, vol. 22, No. 11, pp. 1330-1334 (2000).
Welch et al., "The Hiball Tracker: High-Performance Wide-Area Tracking for Virtual and Augmented Environments," Proceedings of the ACM Symposium on Virtual Reality Software and Technology, pp. 1-11 (1999).
Tsai et al., "A New Technique for Fully Autonomous and Efficient 3d Robotics Hand/Eye Calibration," IEEE Transactions on Robotics and Automation, vol. 5, No. 3, pp. 345-358 (1989).
Brown, "Decentering Distortion of Lenses," Photometric Engineering, vol. 32, No. 3, pp. 444-462 (1966).
Notice of Allowance and Fee(s) Due and Examiner-Initiated Interview Summary for U.S. Appl. No. 14/776,244 (dated Oct. 3, 2017).
Notice of Allowance and Fee(s) Due for U.S. Appl. No. 16/008,682 (dated Apr. 23, 2019).
Final Office Action for U.S. Appl. No. 15/522,765 (dated Apr. 11, 2019).
Applicant-Initiated Interview Summary for U.S. Appl. No. 15/522,765 (dated Feb. 8, 2019).

\* cited by examiner

METHODS, SYSTEMS, AND COMPUTER READABLE MEDIA FOR UNIFIED SCENE ACQUISITION AND POSE TRACKING IN A WEARABLE DISPLAY

PRIORITY CLAIM

This application claims the benefit of U.S. Provisional Patent Application Ser. No. 61/648,552, filed May 17, 2012; the disclosure of which is incorporated herein by reference in its entirety.

TECHNICAL FIELD

The subject matter described herein relates to methods and systems for head-mounted virtual or augmented reality displays. More particularly, the subject matter described herein relates to methods, systems, and computer readable media for unified scene acquisition and pose tracking in a wearable display.

BACKGROUND

Virtual reality (VR) systems present to the user computer-generated images that simulate the user's presence in real or imaginary worlds. In fully immersive VR systems, the user's view of their actual surroundings is completely replaced by the simulated surroundings, which may be real, artificial, or both. Another type of VR system combines images of the real world in the vicinity of the user with computer-generated images (CGI) that provide additional information to the user. This type of VR system is herein referred to as an augmented reality (AR) system. Unlike fully immersive VR systems, AR systems allow the user to see at least a portion of their actual surroundings, usually overlaid with CGI. AR systems may be divided into two categories: those in which the user directly sees their actual surroundings, referred to as "see-through" displays, and those where a camera captures images of their actual surroundings and presents the captured image to the user via a display screen, referred to as "opaque" displays.

FIG. 1A shows a conventional VR system which is fully immersive and presents artificial surroundings to the user. In FIG. 1A, a user 100 wears a head-mounted display 102 which presents to user 100 a view of a computer-simulated image, usually rendered by a computer generated image (CGI) unit 104. An external pose tracker system (PT) 106 determines the pose of user 100, e.g., using cameras or lasers to detect special markers 108 worn by user 100 and using the detected markers to derive pose information. As used herein, the term "pose" refers to information about the location of the user's head in three-dimensional space, referred to as the "position", as well as the direction in which the user's face is pointing, referred to as the "orientation". Thus, pose includes both position and orientation. A rendering unit (RU) 110 combines scene information from CGI unit 104 with pose information from PT 106 and renders an artificial scene which is displayed by head-mounted display 102. The conventional system shown in FIG. 1A is fully immersive, i.e., it does not include or display local scene information, and thus head-mounted display 102 typically uses opaque display devices.

FIG. 1B shows a conventional VR system which is fully immersive and presents real, remote surroundings to the user. The conventional system in FIG. 1B is almost identical to the one in FIG. 1A, except that in FIG. 1B, scene information is provided by a scene acquisition (SA) device 112, such as a remote camera or endoscopic camera, which captures real images, rather than the artificial or simulated images generated by the system shown in FIG. 1A.

FIG. 1C shows a conventional AR system in which user 100 wears a see-through display 114, which allows user 100 to see the local scene information directly through the transparent lens of the display. Rendering unit 110 generates an augmented reality image which appears to the user to be overlaid with the local scene image. This overlay may be text or simple graphics. In some systems, a scene acquisition unit SA 112 may provide limited scene acquisition capability, such as gesture detection. Because these systems do not have any pose-tracking capability, their usefulness is limited to providing announcements to the user, e.g., to alert the user to an incoming call or text message or provide driving directions, or to allow the user to perform simple tasks, such as viewing email, using gestures instead of a mouse or keyboard.

FIG. 1D show the conventional AR system of FIG. 1C, but with the addition of pose tracking information, which is provided by an external pose tracker 106. The addition of pose information would allow rendering unit 110 to adjust the position of the virtual image based on the user's pose. While this allows for more sophisticated AR effects, e.g., a virtual direction arrow shown in the user's display to indicate to the user the location of a restaurant, subway station, and so on, would rotate out of view when the user turns his or her head. However, conventional technologies still require an external pose tracker, which limits the usefulness of such a system.

FIG. 1E shows a conventional telepresence application being used by two users, user A 100A and user B 100B, who are in separate locations and each wearing a display unit (102A and 102B, respectively.) Each location includes a scene acquisition device (112A and 112B, respectively), a pose tracker (106A and 106B, respectively), and a rendering unit (110A and 110B, respectively.) User A is local to scene A and remote to scene B; user B is local to scene B and remote to scene A. Scene A information, including the image of user A 100A, is sent to user B's headset 102B, which also receives user B 100B pose information from PT 106B to generate an image of user A 100A in local scene B based on the current pose of user B 1008. Likewise, scene B information, including the image of user B 100B, is sent to user A's headset 102A, which also receives user A 100A pose information from PT 106A to generate an image of user B 100B in local scene A based on the current pose of user A 100A.

There are disadvantages to the conventional VR systems shown in FIGS. 1A through 1E. Not all of the systems in FIGS. 1A through 1E have both pose tracking and scene acquisition, and those that do require an external pose tracker 106 that is separate from the head-mounted display.

Accordingly, in light of these disadvantages associated with conventional VR systems, there exists a need for methods, systems, and computer readable media for unified scene acquisition and pose tracking in a wearable display.

SUMMARY

According to one aspect, a system for unified scene acquisition and pose tracking in a wearable display includes a wearable frame configured to be worn by a user. Mounted on the frame are: at least one sensor for acquiring scene information for a real scene proximate to the user, the scene information including images and depth information; a pose tracker for estimating the user's head pose based on the acquired scene information; a rendering unit for generating a virtual reality (VR) image based on the acquired scene information and estimated head pose; and at least one display for displaying to the user a combination of the generated VR image and the scene proximate to the user.

According to another aspect, the subject matter described herein includes a method for unified scene acquisition and pose tracking in a wearable display. The method includes: acquiring, from a sensor that is mounted to a display frame configured to be worn by a user, scene information for a scene proximate to a user, the scene information including image and depth data; estimating, by a pose tracker that is mounted to the display frame, the user's head pose based on the acquired scene information; generating, by a rendering unit that is mounted to the display frame, a virtual reality (VR) image based on the acquired scene information and estimated head pose; and displaying to the user a combination of the generated VR image and the scene proximate to the user using at least one display that is mounted to the display frame.

The subject matter described herein can be implemented in software in combination with hardware and/or firmware. For example, the subject matter described herein can be implemented in software executed by a processor. In one exemplary implementation, at least a portion of the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for unified scene acquisition and pose tracking in a wearable display are provided. The subject matter described herein includes a unified approach to a system envisioned as a pair of eyeglasses with integrated display that would overlay the wearer's view of the local surrounding and include multiple miniature cameras and inertial sensors and computational and communication modules in the frame of eyeglasses. In one embodiment, the system would simultaneously acquire and build up a visual model of the surrounding scene while it also estimates the location and orientation of the eyeglasses and the hand gestures and body pose of the wearer; some of the cameras would be pointing toward different parts of the wearer's body, including the eyes, mouth, hands, and feet. The display would optically overlay the eyeglasses, allowing options of the synthetic imagery to relate visually to the wearer's surroundings. some of the cameras may be positioned to estimate the view of the surrounding that would closely match that of the wearer.

Multiple such systems operating in the same surroundings could assist each other with tracking and scene acquisition tasks by sharing information about the scene and about information each would have about the other, for example if cameras of one system observe the other system(s) nearby. Applications of such a system would include personal assistance, navigation, medical and health care and telepresence. As one example, in telepresence applications, wearers of systems in one location could observe a distant scene that is acquired by one or more systems at that distant scene, and observe and interact with the multiple distant users.

Reference will now be made in detail to exemplary embodiments of the present invention, examples of which are illustrated in the accompanying drawings. Wherever possible, the same reference numbers will be used throughout the drawings to refer to the same or like parts.

Figure 1A:
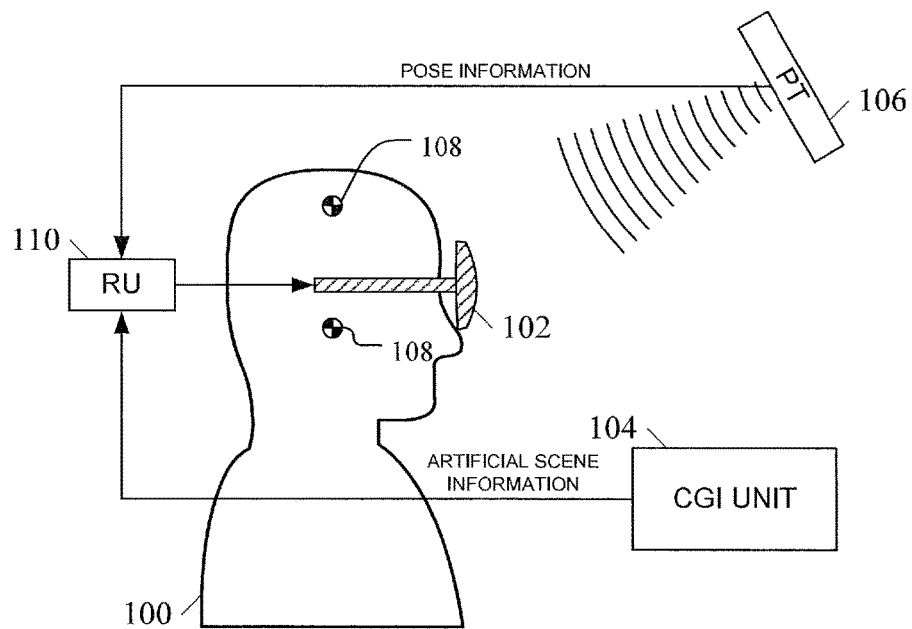
FIGS. 1A through 1E illustrate conventional approaches to virtual or augmented reality systems.
Figure 1B:
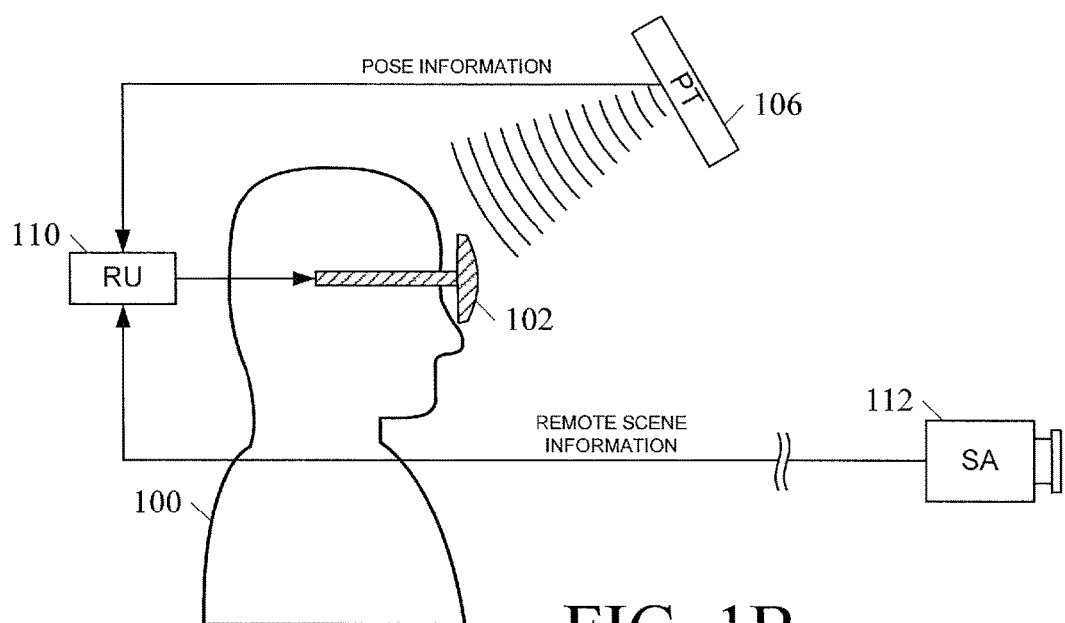
Figure 1C:
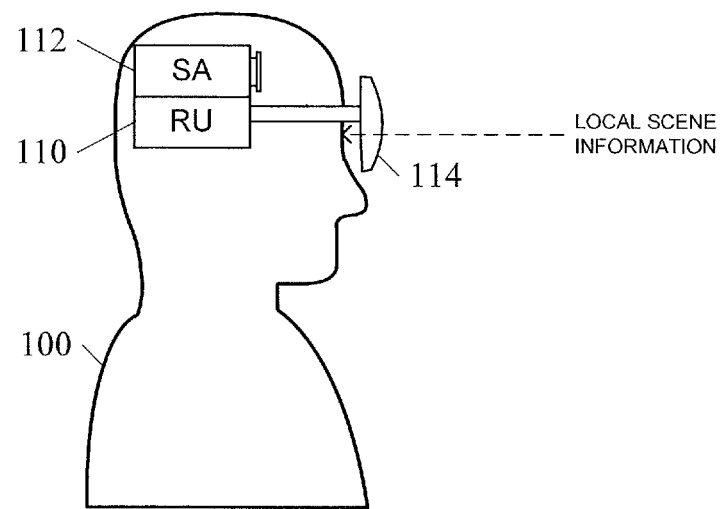
Figure 1D:
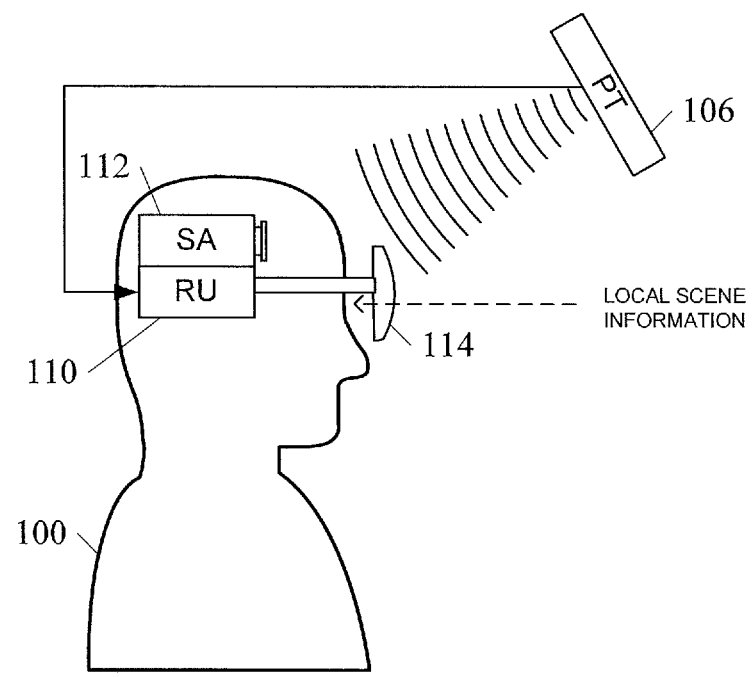
Figure 1E:
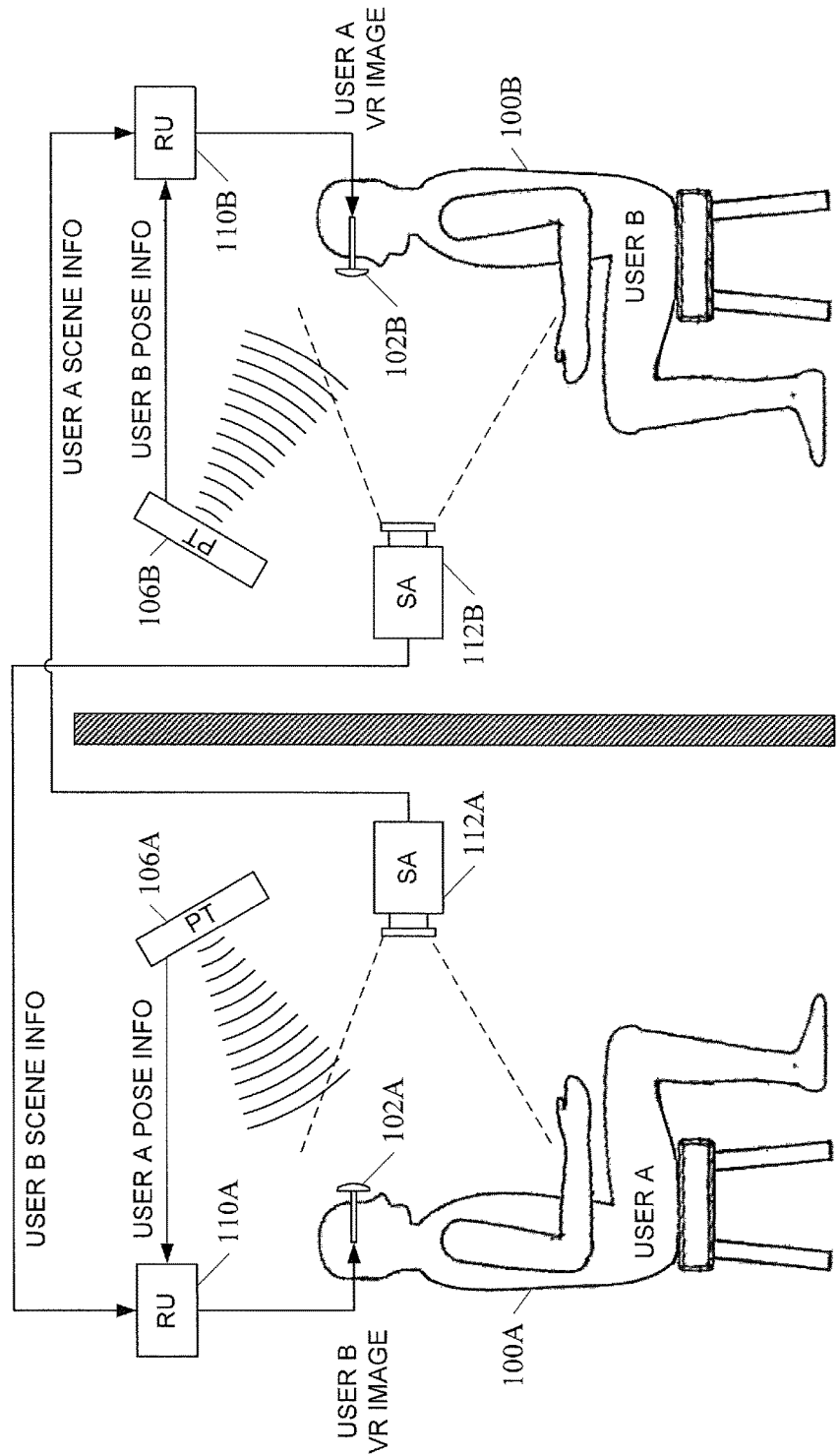
Figure 2:
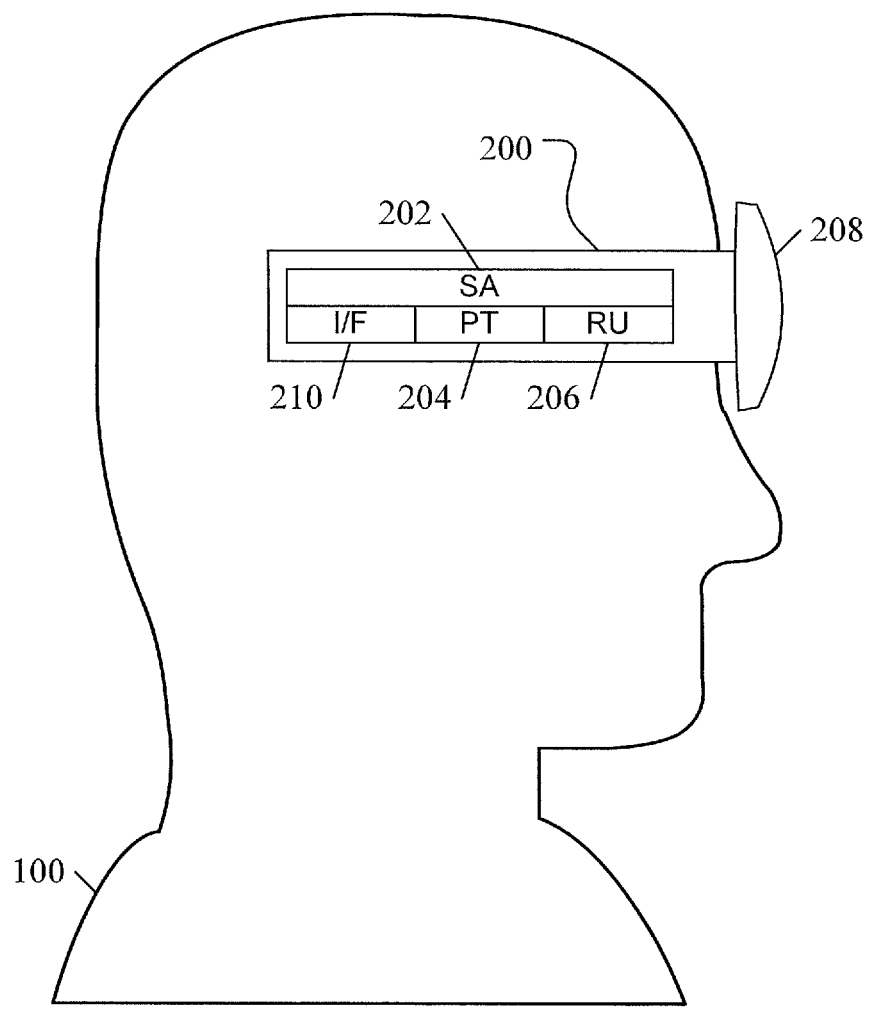
FIG. 2 is a block diagram illustrating an exemplary system for unified scene acquisition and pose tracking in a wearable display according to an embodiment of the subject matter described herein.

FIG. 2 is a block diagram illustrating an exemplary system for unified scene acquisition and pose tracking in a wearable display according to an embodiment of the subject matter described herein. Mounted to a wearable frame 200 is a scene acquisition module (SA 202) for acquiring scene information for a scene proximate to a user 100, the scene information including image and depth data. Scene information is provided to a pose tracker (PT 204), which uses the acquired scene information to generate user pose information, such as an estimated pose of user 100. A rendering unit (RU 206) uses the pose information generated by PT 204 and the scene information acquired by SA 202 to generate a VR image, which is provided to one or more display units (display 208). RU 206 may be implemented by at least one processor. Display 208 displays to user 100 a combination of the generated VR image and the scene proximate to user 100. In one embodiment, wearable frame 200 may include a communication interface module (I/F 210) for sending or receiving scene, pose, or other information to or from a remote receiver, which may be one or more other wearable displays.

In one embodiment, wearable frame 200 may be similar in size and shape to an eyeglasses frame, with resilient members that fit over the user's ears and may apply slight pressure to the opposing sides of the use's head. Examples of a wearable frame 200 include, but are not limited to a frame for eyeglasses, a pair of goggles, a helmet, a hat, or other headgear.

Figure 3:
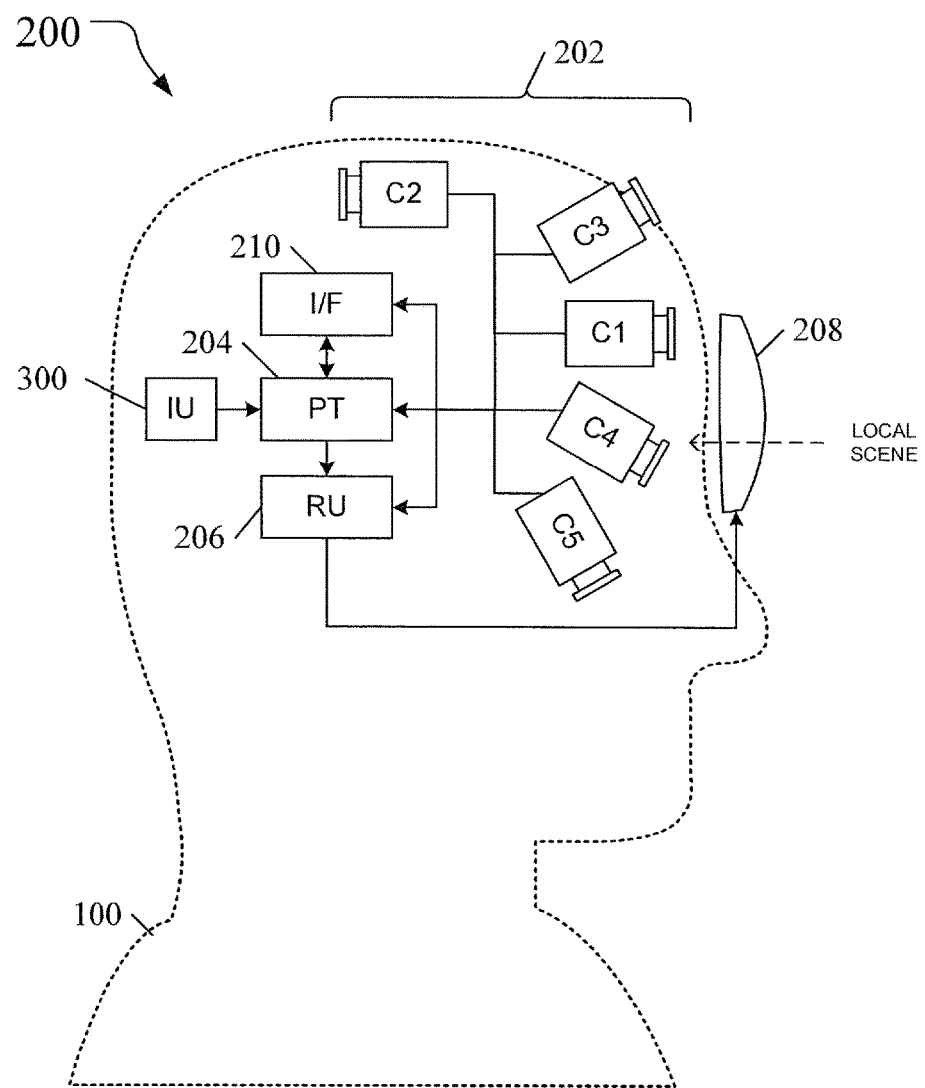
FIG. 3 is a block diagram illustrating in more detail an exemplary system for unified scene acquisition and pose tracking in a wearable display according to an embodiment of the subject matter described herein.

FIG. 3 is a block diagram illustrating in more detail an exemplary system for unified scene acquisition and pose tracking in a wearable display according to an embodiment of the subject matter described herein. Wearable frame 200 is omitted from FIG. 3 for clarity. In one embodiment, scene acquisition module 202 includes one or more cameras and/or sensors, which are used both for scene acquisition and pose tracking. In the embodiment illustrated in FIG. 3, the various cameras or sensors are oriented in different directions, such as forward (C1), backward (C2), up (C3), down (C4), and so on. Cameras C1-CN may acquire images, depth information, or both from the real scene proximate to user 100. In one embodiment, a camera (C5) may be pointed toward the user's hands or feet, e.g., to capture the user's gestures, body pose, etc. In one embodiment, user gestures or poses can be used to create a 3D model of the user. This allows a user to use gestures to control the operation of the wearable frame 200 and/or other components of the system. In one embodiment, for example, human pose and/or gestures can be estimated by template matching, by machine learning, or by other techniques. The human poses or gestures so learned can be used to improve the 3D model of the user, such as filling the holes or smoothing the noise. Other cameras may be mounted onto wearable frame 200 and oriented to capture an image of the user's face, eyes or mouth, etc.

In some applications, such as telepresence, an additional camera or sensor (not shown) that is not mounted to wearable frame 200 may be used to provide images or 3D data of user 100. In one embodiment, one or more image or position sensors may be mounted to the walls of a teleconference room to acquire images of each party to the teleconference and provide those images to the other party to the teleconference. The pose data or estimated pose information continually generated by PT 204 allows scene information acquired by the head-mounted SA 202 to be easily merged with scene data acquired by external or wall-mounted sensors. Alternatively, wearable frame 200 may include an additional camera or sensor mounted to the frame such that the camera or sensor is located away from the user (e.g., in front of and slightly out of the line of sight of the user) and oriented toward the user's face or body so as to provide the desired image of the user for use by the remote user.

The outputs of the cameras and/or sensors of SA 202 are provided to both pose tracker 204 and rendering unit 206. The pose information generated by PT 204 is also sent to RU 206, so that RU 206 can generate a VR image based on the acquired scene information and generated user pose information. This allows wearable frame 200 to generate VR images that appear to be in the same physical location as (i.e., "local to") user 100. In one embodiment, display 208 is a see-through display which allows user 100 to directly see the local scene, which is overlaid with the VR images generated by RU 206. Because RU 206 has user pose information from PT 204, RU 206 can create a VR image that appears to user 100 to be stationary with respect to the local scene.

In addition, because RU 206 has scene information from SA 202, RU 206 can occlude a portion of the VR image so that the VR image appears to be behind real objects local to user 100. For example, in a telepresence application, user 100 may be sitting at a table across from a virtual participant. SA 202 provides depth information of the local scene, including the position of the table in front of user 100. RU 206 may generate a VR image of the virtual participant, e.g., from information that it received from a remote location via interface 210. Since RU 206 knows that a table is between user 100 and the perceived location of the virtual participant, RU 206 will not display the parts of the virtual participant that would be behind or underneath the table if the virtual participant were actually in the room with user 100. Similarly, if user 100 raised his or her hand, as if to block the image of the virtual participant's face, SA 202 would generate scene information that included the user's hand between the user's face and the perceived location of the virtual participant, which SA 202 would provide to RU 206. RU 206 would use that information along with updated pose information from PT 204 to generate a VR display of the virtual participant's face except for the portion that was blocked from the user' view by the user's hand.

In one embodiment, wearable frame 200 may include an on-board inertial sensor unit (IU 300), which may provide inertial data to pose tracker 204 to assist with determining user pose. Example inertial sensor units include, but are not limited to, accelerometers, gyroscopes, and compasses. Inertial data, which includes but is not limited to acceleration and angular speed, is useful especially when the scene information provided by cameras CN has dimly illuminated, has poor contrast, or includes highly repetitive visual structures, which make determining pose difficult using image data alone. IU 300 can assist PT 204 achieve a robust tracking result during fast head movement as well. Pose tracker 204 may use image data, depth data, inertial data, or any combination when generating user pose information.

Display 208 may be a transparent, optical see-through display. For example, display 208 may include a pair of LCD or OLED screens, a pair of projectors that project an image onto a partially reflective transparent surface that reflects the image into the eyes of user 100, or other display means. Alternatively, display 208 may be an opaque, video see-through display. An example of a see-through display is described in U.S. Pat. No. 6,503,195, the disclosure of which is incorporated herein by reference in its entirety.

Wearable frame 200 may be used for fully immersive virtual reality. Scene information acquired by SA 202 may be used to determine pose tracking without the need for the external pose trackers used by conventional systems. Wearable frame 200 is well suited for augmented reality applications and other applications that use a see-through display, since SA 202 can acquire local scene information that can be combined with a VR image. Other applications include telepresence, medical and health care, immersive navigation, immersive training, and entertainment.

In one embodiment, for example, RU 206 can be configured to select what portion of the local scene will be overlaid with the VR image. In a telepresence application, for example, the remote participant may be rendered so that the remote participant appears to be in the local scene of user 100. In another configuration, the local scene of user 100 may appear to extended into the remote scene, i.e., where user 100 sees images of the local scene and images of the remote scene together. In this configuration, RU 206 may render local scene components that are within a threshold distance away from user 100. In a third configuration, RU 206 may entirely replace the local scene with the remote scene, i.e., full immersion. RU 206 may generate a VR scene that is entirely artificial, entirely real, or some combination.

Figure 4:
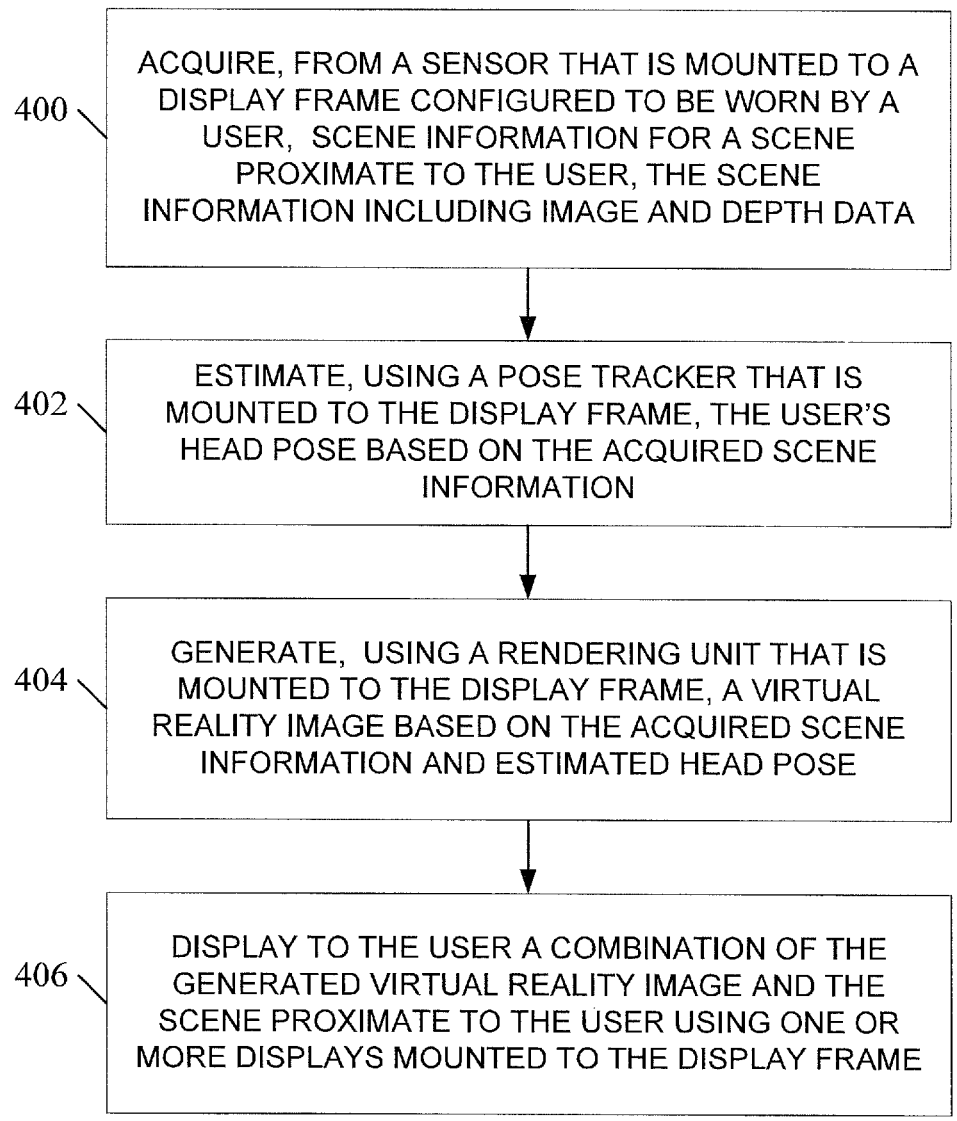
FIG. 4 is a flow chart illustrating an exemplary process for unified scene acquisition and pose tracking in a wearable display according to an embodiment of the subject matter described herein.

FIG. 4 is a flow chart illustrating an exemplary process for unified scene acquisition and pose tracking in a wearable display according to an embodiment of the subject matter described herein.

Step 400 includes acquiring, from a sensor that is mounted to a display frame configured to be worn by a user, scene information for a scene proximate to the user, the scene information including image and depth data. In the embodiment illustrated in FIG. 2, for example, scene acquisition module 202 may include cameras and depth sensors that are mounted to wearable frame 200 and that provide images and depth data of the local scene. In one embodiment, the scene information provided by SA 202 may be collected over time to build up a 3D model of the local environment.

Step 402 includes estimating, using a pose tracker that is mounted to the display frame, the user's head pose based on the acquired scene information. In the embodiment illustrated in FIG. 2, for example, pose tracker 204 may use the output(s) of SA 202 to estimate the user's head pose. In one embodiment, PT 204 may continually receive image and/or depth data from SA 202, which PT 204 then compares to the built-up 3D model to estimate the user's position and orientation in relationship to the 3D model of the scene.

Step 404 includes generating, using a rendering unit that is mounted to the display frame, a virtual reality image based on the acquired scene information and estimated head pose. In the embodiment illustrated in FIG. 2, for example, rendering unit 206 may receive user pose information from PT 204 and scene information from SA 202 to determine where in the user's field of view the VR image should be displayed and what portions of that image should be occluded by local objects in order to give the illusion that the VR image is located in the local scene. In fully immersive applications, RU 206 may generate the VR image based on real-time pose information acquired by comparison of current scene information to a previously-acquired 3D model of the local scene, and display the VR image in combination with a model of a remote scene that has also been previously acquired. In one embodiment, the VR image is of real objects whose image and/or depth data has been acquired remotely and sent to wearable frame 200 via communications interface I/F 210. Step 406 includes displaying to the user a combination.

Step 406 includes displaying to the user a combination of the generated virtual reality image and the scene proximate to the user using one or more displays mounted to the display frame. In one embodiment, wearable frame 200 includes a stereo display 208 that provides a simulated 3D image to user 100.

In one embodiment, the method can be performed by multiple wearable displays 200 operating in parallel and sending information to each other and/or to a centralized location. For example, the local scene information acquired by each unit's SA module may be combined to build up a very detailed model of the local scene. Such a 3D model may be generated or built-up during an initial phase in which multiple users, each wearing a wearable frame 200, scan the surrounding environment, e.g., until enough data has been collected to make a sufficiently detailed 3D model. In one embodiment, the 3D model is continually created and updated as new information from one or more users' wearable displays 200 is acquired. For example, analysis of acquired scene data over time may allow the system to determine which elements of the scene are relatively static, e.g., walls, floors, heavy furniture, etc., and which are relatively mobile, e.g., people, chairs, objects on a table top, moving or swaying objects such as plants and fans, etc. The 3D model may then be shared for use by other local and/or remote users.

Multiple displays operating together may be used to provide details about the users as well. For example, one user's wearable frame 200 may acquire the image, size, shape, pose, and position of another user. This information may be fed back to the other user for use by the other user's pose tracker. Multiple users at a remote scene can provide images of each other, which are then sent to local users, thus obviating the need for the external scene acquisition units required by conventional telepresence applications.

The systems and methods described herein for unified scene acquisition and pose tracking in a wearable display have several advantages over conventional systems. Wearable frame 200 is self-contained, and does not require external pose tracking systems. In addition, wearable frame 200 may be constructed of commercially available components such as those found in smart-phones and position sensors such as those used by game consoles. Multiple wearable frames 200 in the same local environment can cooperate to capture more completely the 3D description of the local environment, and can assist each other for improved pose tracking. Each wearable frame 200 provides a unified platform for performing scene acquisition, pose tracking, and human gesture recognition.

The systems and methods described herein for unified scene acquisition and pose tracking in a wearable display may be combined with other techniques that improve the quality of the VR image. For example, wearable frame 200 may be used in a general-purpose telepresence system design that can be adapted to a wide range of scenarios and that allows users to see remote participants and their surroundings merged into the local environment through the use of an optical see-through head-worn display. Wearable frame 200 provides real-time 3D acquisition and head tracking and allows the remote imagery to be seen from the correct point of view and with proper occlusion. The addition of a projector-based lighting control system permits the remote imagery to appear bright and opaque even in a lit room. Immersion can be adjusted across the VR continuum.

Figure 5:
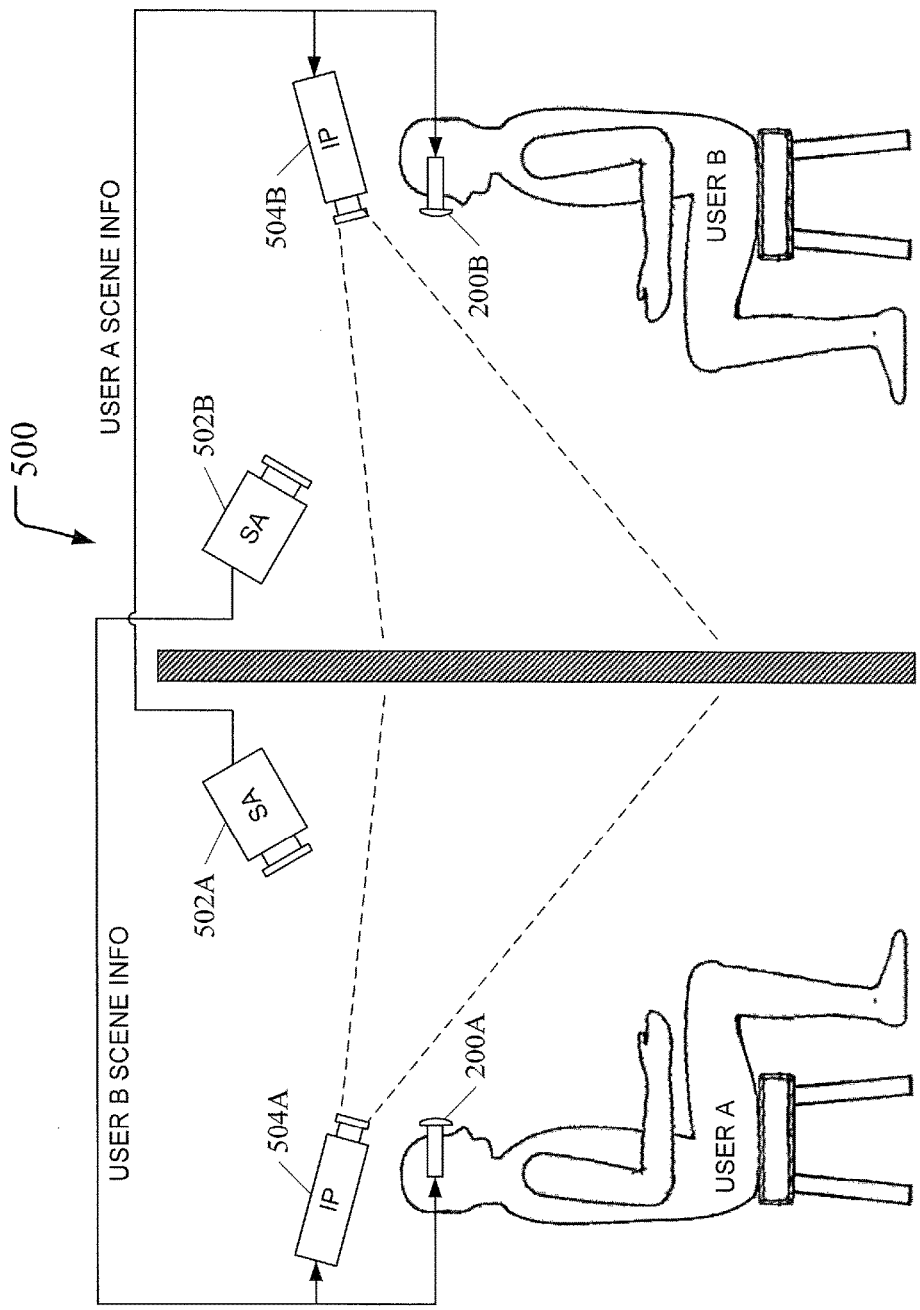
FIG. 5 illustrates a general-purpose telepresence system according to an embodiment of the subject matter described herein.

FIG. 5 illustrates a general-purpose telepresence system according to an embodiment of the subject matter described herein. In embodiment illustrated in FIG. 5, telepresence system 500 includes, for each participant (User A and User B in this example), a scene acquisition unit (502A and 502B, respectively) for acquiring scene information including an image of the participant, and an illumination projector (504A and 504B, respectively) for illuminating the local scene in such a way that only the portions of the local scene that would not be obscured by the VR image of the remote user are illuminated. Each user has a wearable frame (200A and 200B, respectively) for displaying to the respective user a VR image of the other user combined with an image of the respective user's local scene. In the embodiment illustrated in FIG. 5, for example, wearable frame 200A displays to User A a VR image of User B that overlays the image of User A's local scene, e.g., so that User B appears to inside User A's local scene. Some see-through displays, such as LCD panels, OLED panels, and projection-on-glass displays, do not have the capability to become opaque. In these displays, the VR image of User B would appear dim, translucent, or washed-out if User A's local scene is brightly lit.

In order to compensate for the inability of some see-through displays to become opaque, the remote scene info is provided to not only to User A's wearable frame 200A but also to illumination projector 504A. IP 504A also receives from wearable frame 200A pose information for User A. IP 504A uses the remote scene information from SA 502B and the pose information from wearable frame 200A to calculate which portions of User A's local scene will be overlaid with the VR image of User B, and illuminates everything in the local scene except those portions. This is shown in more detail in FIG. 6.

Figure 6:
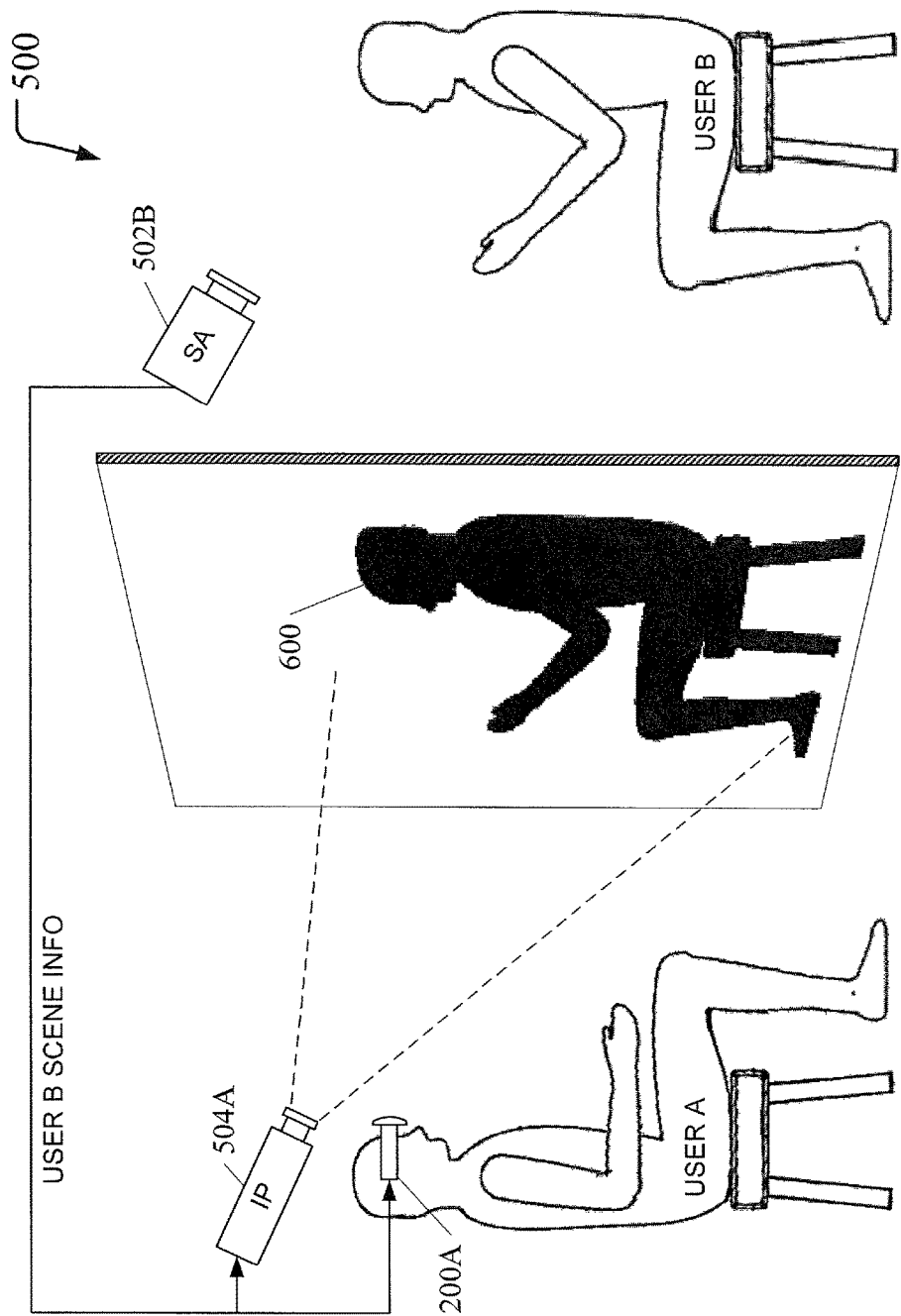
FIGS. 6-8 illustrate in more detail a portion of a general-purpose telepresence system according to embodiments of the subject matter described herein.

FIG. 6 illustrates in more detail a portion of the general-purpose telepresence system 500 according to an embodiment of the subject matter described herein. In FIG. 6, portions of system 500 are omitted for clarity. In the example shown in FIG. 6, wearable display 200A is receiving scene information for the scene local to User B, including an image of User B, that was acquired by camera 502B, and displaying to User A a virtual reality image of User B. This VR image of User B is displayed only on the lenses of wearable display 200A. In order that this VR image not be washed out by light from the scene local to User A, IP 504A illuminates the scene local to User A everywhere except for the apparent location of User B from the point of view of User A based on the current pose of User A. In one embodiment, IP 504A illuminates the local scene with white light, but other images may be projected by IP 504A. The portion of User A's local scene in which the VR image of User B appears to be located remains in shadow, shown in FIG. 6 as outline 600. Because that portion of User A's local scene is not lit, the VR image of User B displayed on wearable display 200A is not washed out but instead appears brighter to User A. As a result, the VR image of User B appears more substantial and thus more real.

Figure 7:
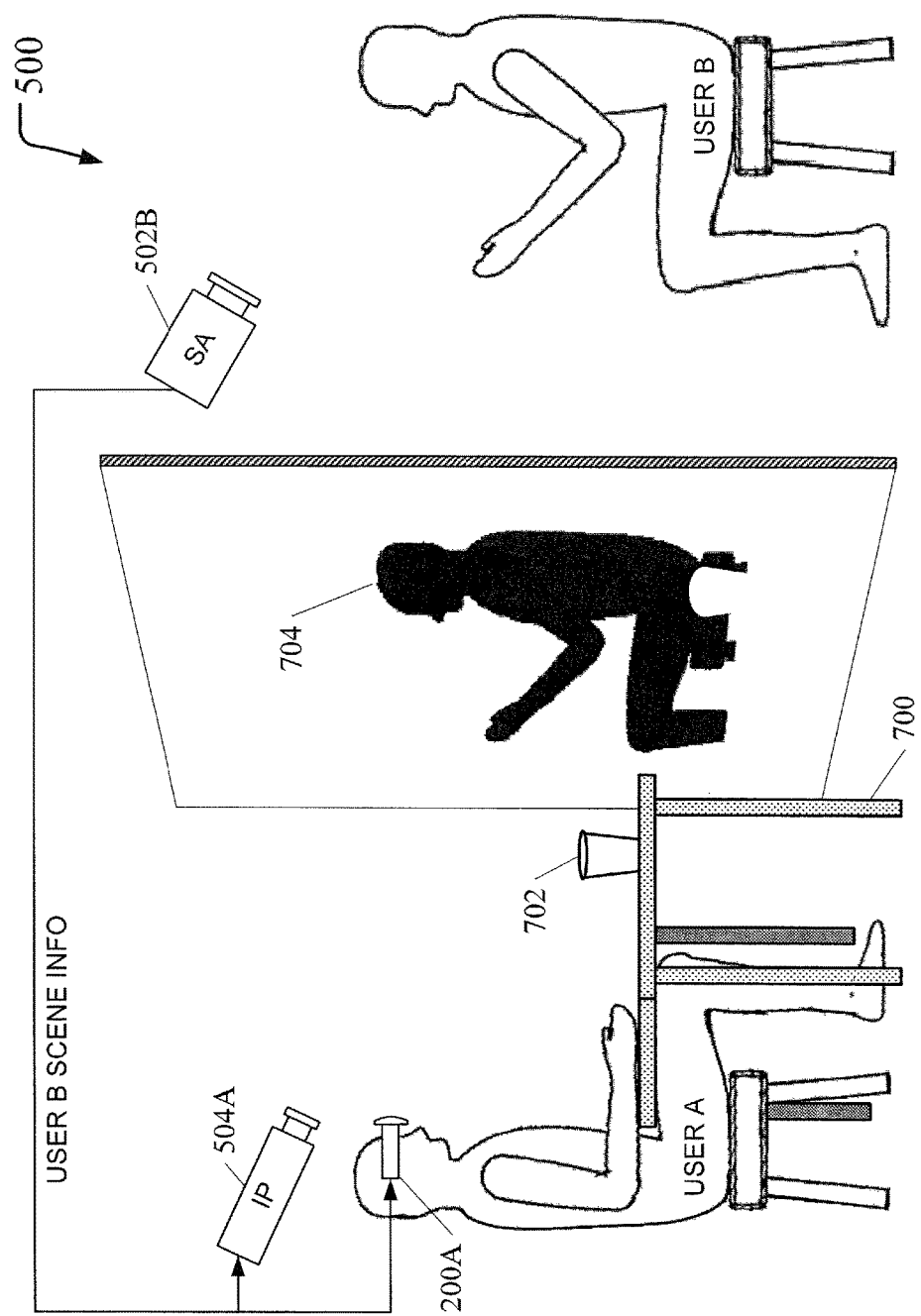

FIG. 7 illustrates another aspect of system 500 that is made possible by wearable frame 200A. Because wearable frame 200A includes both pose tracking and scene acquisition, it can detect the presence of objects in the local scene that would block the view of portions of the remote scene from the viewpoint of the local user. In the embodiment illustrated in FIG. 7, for example, User A's view of the lower part of User B would be obscured by a table 700 and cup 702, and so the VR image of User B generated by RU 206 of wearable frame 200A is truncated accordingly. Since the bottom portion of the virtual image of User B is truncated, the un-illuminated portion of the local scene 704 below the calculated sightline is similarly truncated.

It can be readily understood that the use of an illumination projector 504A allows the system 500 to control the level of immersion perceived by User A. In the embodiments shown in FIGS. 6 and 7, for example, wearable display 200A creates the illusion that User B is present within User A's local scene, because the only portion of User A's local scene that is not lit is the portion that is in the line of sight of the VR image of User B that wearable display 200A presents to User A. However, by illuminating only portions of User A's local scene that are immediately proximate to User A, such as table 700 and cup 702, more of the remote scene can be displayed to User A. This can give the impression that the User A's local scene has extended into the remote scene. This is shown in FIG. 8.

Figure 8:
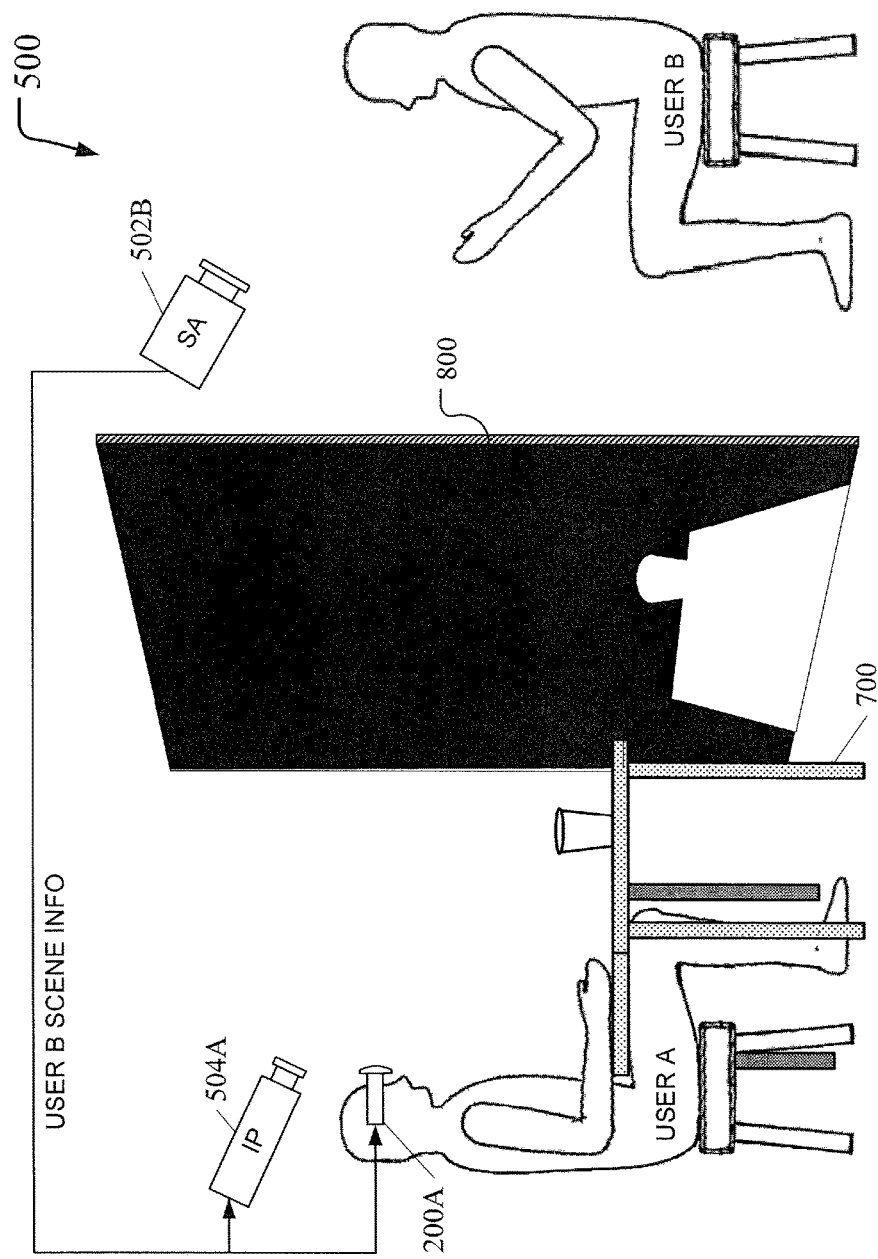

FIG. 8 illustrates yet another aspect of system 500 that is made possible by the combination of wearable frame 200A and IP 504A. In this example, IP 504A illuminates only the portions of the local scene that are close to User A, such as table 700 and cup 702. All of the unlit portion 800 of User A's local scene will contain VR images. As a result, it will appear to User A that table 700 and cup 702 exist within the remote scene provided by camera 502B, rather than User B appearing to exist with the local scene as in FIG. 7. Thus, by controlling what portion of the local scene is and is not illuminated by IP 504A and by generating a corresponding VR image, different levels of immersion are possible using the same system 500. Moreover, the use of projector-based lighting control to illuminate all local surfaces except those occluded by a virtual object allows the use of optical see-through displays. In telepresence applications in particular, optical see-through displays allow eye contact to maintained.

In one embodiment, the shape of the unlit or shadowed portion may be calculated using the following method:

1. render the scene from the perspective of the projector using the local sensor data and save Z-buffer as a depth map.
2. Render the scene from the perspective of the viewer using the remote sensor data and save Z-buffer as a depth map (generated as part of the 3D reconstruction process).
3. For each pixel in the projector image, project the corresponding depth value from the projector depth map from step 1 onto the viewer depth map from step 2.
4. If the viewer depth value from step 3 represents a closer depth value than the corresponding projector depth value, draw the pixel as black, otherwise as white.
5. When the projector mask is complete, fill any small holes (i.e. missing depth values) and apply a small blur. This step reduces two distracting artifacts: bright light shining through non-existent holes in virtual objects, and hard projector mask edges that are visible due to small calibration or tracking errors.

In the embodiments illustrated in FIGS. 5 through 8, system 500 is optimized for a single monoscopic user, but the concept may be extended for multiple users. Multiple views can be achieved through time multiplexing with high speed projectors and synchronized viewer worn shutters. The use of high-intensity projectors, including the use of DLP projectors with the color filters removed, provides an increase in brightness and frame rate that would offset the corresponding losses from time-multiplexing. An additional time slice with all shutters open, projectors turned off, and the eyes illuminated could be used to preserve eye contact.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for unified scene acquisition and pose tracking in a wearable display, the system comprising:
   a wearable frame configured to be worn on the head of a user, the frame having:
   at least one camera mounted to the wearable frame for acquiring scene information for a real scene proximate to the user, the scene information including images and depth information, the scene information including positions of real objects separate from the user in the real scene local to the user;
   at least one sensor mounted to the wearable frame for acquiring images of gestures and body poses of the user;
   a pose tracker mounted to the wearable frame for generating, based on the scene information, a 3D model of the scene, generating, based on the images of gestures and body poses of the user acquired by the at least one sensor, a 3D model of the user, and estimating a position and orientation of the user in relation to the 3D model of the scene based on the images and depth information acquired by the at least one camera mounted to the frame and the images of gestures and body poses of the user acquired by the at least one sensor;
   a rendering unit mounted to the wearable frame for generating a virtual reality (VR) image based on the scene information acquired by the at least one camera and the estimated position and orientation of the user in relation to the 3D model of the scene, wherein the rendering unit receives, from a location remote from the user, images and depth information of real objects acquired in a remote scene, the images and depth information of real objects including an image and depth information of a virtual participant in a meeting, wherein the rendering unit receives the positions of the real objects in the scene local to the user, and determines, based on the positions of the real objects and a perceived location of the virtual participant, portions of the image of the virtual participant to occlude in the VR image, wherein image of the virtual participant comprises an image of a human participant captured by a camera local to the human participant and remote from the user; and at least one display mounted to the frame for displaying to the user a combination of the generated VR image and the scene local to the user, wherein the VR image includes the image of the virtual participant with the portions occluded as determined by the rendering unit.

2. The system of claim 1 wherein the wearable frame comprises an eyeglasses frame.

3. The system of claim 1 wherein the scene information is used to generate the 3D model of the scene local to the user.

4. The system of claim 1 wherein the pose tracker includes an inertial sensor that aids the pose tracker in estimating the position and orientation of the user in relation to the 3D model of the scene local to the user.

5. The system of claim 1 wherein the VR image is at least one of: an artificial image and a real, remote image.

6. The system of claim 1 wherein the rendering unit is configured to occlude a portion of the VR image based on a perceived location of the VR image in the scene local to the user.

7. The system of claim 1 wherein the at least one display comprises at least one of: an optical see-though display and a video see-through display.

8. The system of claim 1 wherein the at least one sensor is configured to acquire:
an image of the user's face, hands, feet, or body;
a hand gesture of the user; and
a body pose of the user.

9. The system of claim 8 wherein the user information is communicated to at least one of: the rendering unit and a remote receiver.

10. The system of claim 8 wherein the user information is used for gesture recognition.

11. The system of claim 1 comprising a communications unit for communicating with a remote receiver.

12. The system of claim 11 wherein the communications unit communicates via a wireless local network.

13. The system of claim 11 wherein the communications unit receives the images and depth information of the real objects in the remote scene.

14. The system of claim 11 comprising a plurality of wearable displays, each wearable display being worn by one of a plurality of users, wherein each of the plurality of wearable displays communicate with at least one of: the remote receiver and another of the plurality of wearable displays.

15. The system of claim 14 wherein scene information is generated from scene data acquired by the plurality of wearable displays.

16. The system of claim 11 wherein the remote receiver is a component of a telepresence application.

17. The system of claim 1 wherein the system further comprises an illumination projector for illuminating a first portion of the scene local to the user and for leaving as unlit a second portion of the scene local to the user that corresponds to an apparent location of the virtual participant from a point of view of the user viewing the image of the virtual participant displayed on the display to create an impression that the virtual participant is present within the scene local to the user.

18. A method for unified scene acquisition and pose tracking in a wearable display, the method comprising:
acquiring, from at least one camera that is mounted to a wearable display frame configured to be worn on the head of a user, scene information for a scene local to the user, the scene information including images and depth information, the scene information including positions of real objects separate from the user in the real scene local to the user;
acquiring, using at least one sensor mounted to the wearable frame, images of gestures and body poses of the user;
generating, by a pose tracker that is mounted to the wearable display frame and based on the scene information, a 3D model of the scene, generating, by the pose tracker, from the images of gestures and body poses of the users acquired by the at least one sensor, a 3D model of the user, and estimating, by the pose tracker, a position and orientation of the user in relation to the 3D model of the scene based on the images and depth information acquired by the at least one camera and the images of the gestures and body poses of the user acquired by the at least one sensor;
generating, by a rendering unit that is mounted to the wearable display frame, a virtual reality (VR) image based on the scene information acquired by the at least one camera and the estimated position and orientation of the user in relation to the 3D model of the scene, wherein the rendering unit receives, from a location remote from the user, images and depth information of real objects acquired in a remote scene, the images and depth information of real objects including an image and depth information of a virtual participant in a meeting, wherein the rendering unit receives the positions of the real objects in the scene local to the user and determines, based on the positions of the real objects in the scene local to the user and a perceived location of the virtual participant, portions of the image of the virtual participant to occlude in the VR image, wherein image of the virtual participant comprises an image of a human participant captured by a camera local to the human participant and remote from the user; and
displaying to the user a combination of the generated VR image and the scene local to the user using at least one display that is mounted to the wearable display frame, wherein the VR image includes the image of the virtual participant with portions occluded as determined by the rendering unit.

19. The method of claim 18 wherein the display frame comprises an eyeglasses frame.

20. The method of claim 18 wherein the acquired scene information is used to generate the 3D model of the scene local to the user.

21. The method of claim 18 wherein estimating the position and orientation of the user in relation to the 3D model of the scene local to the user includes using inertial information provided by an inertial sensor that is mounted to the display frame.

22. The method of claim 18 wherein generating a VR image comprises generating at least one of: an artificial image and a real, remote image.

23. The method of claim 18 wherein generating a VR image comprises occluding a portion of the VR image based on a perceived location of the VR image in the scene local to the user.

24. The method of claim 18 wherein using at least one display comprises using at least one of: an optical see-though display and a video see-through display.

25. The method of claim 18 comprising acquiring, using the at least one sensor:
an image of the user's face, hand, feet, or body;
a hand gesture of the user; and
a body pose of the user.

26. The method of claim 25 wherein acquiring user information comprises using at least one of:
a sensor that is mounted to the display frame; and
a sensor that is separate from the display frame.

27. The method of claim 25 comprising communicating the user information to at least one of: the rendering unit and a remote receiver.

28. The method of claim 25 comprising using the user information for gesture recognition.

29. The method of claim 18 comprising communicating with a remote receiver.

30. The method of claim 29 wherein communicating with a remote receiver comprises communicating via a wireless local network.

31. The method of claim 29 wherein communicating with a remote receiver comprises receiving, from the remote receiver, the 3D images of the real objects in the remote scene.

32. The method of claim 18 wherein acquiring the scene information comprises acquiring the scene information via a plurality of wearable displays, each wearable display being worn by one of a plurality of users, wherein each of the plurality of wearable displays communicate with at least one of: the remote receiver and another of the plurality of wearable displays.

33. The method of claim 32 comprising using the acquired scene information to build the 3D model of the scene local to the user.

34. The method of claim 18 wherein acquiring the scene information comprises acquiring information about the plurality of users, the information including at least one of image, pose, and position of the plurality of users.

35. The method of claim 18 comprising, using an illumination projector, illuminating a first portion of the scene local to the user and for leaving as unlit a second portion of the scene local to the user that corresponds to an apparent location of the virtual participant from a point of view of the user viewing the image of the virtual participant displayed on the display to create an impression that the virtual participant is present within the scene local to the user.

36. A non-transitory computer readable medium having stored thereon executable instructions that when executed by the processor of a computer control the computer to perform steps comprising:

acquiring, from at least one camera that is mounted to a wearable display frame configured to be worn on the head of a user, scene information for a scene local to a user, the scene information including images and depth information, the scene information including positions of real objects separate from the user in the real scene local to the user;

acquiring, using at least one sensor mounted to the wearable frame, gestures and body poses of the user;

generating, by a pose tracker that is mounted to the wearable display frame and based on the scene information, a 3D model of the scene, generating, by the pose tracker, from the images of gestures and body poses of the users acquired by the at least one sensor, a 3D model of the user, and estimating, by the pose tracker, a position and orientation of the user in relation to the 3D model of the scene based on the images and depth information acquired by the at least one camera and the images of gestures and body poses of the user acquired by the at least one sensor;

generating, by a rendering unit that is mounted to the wearable display frame, a virtual reality (VR) image based on the scene information acquired by the at least one camera and the estimated position and orientation of the user in relation to the 3D model of the scene local to the user, wherein the rendering unit receives, from a location remote from the user, images and depth information of real objects acquired in a remote scene, the images and depth information including an image and depth information of a virtual participant in a meeting, wherein the rendering unit receives the positions of the real objects in the scene local to the user and determines, based on the positions of the real objects and a perceived location of the virtual participant, portions of the image of the virtual participant to occlude in the VR image, wherein image of the virtual participant comprises an image of a human participant captured by a camera local to the human participant and remote from the user; and displaying to the user a combination of the generated VR image and the scene proximate to the user, wherein the VR image includes the image of the virtual participant with the portions occluded as determined by the rendering unit using at least one display that is mounted to the wearable display frame.

37. The non-transitory computer readable medium of claim 36 comprising controlling an illumination projector to illuminate a first portion of the scene local to the user and to leave as unlit a second portion of the scene local to the user that corresponds to an apparent location of the virtual participant from a point of view of the user viewing the image of the virtual participant displayed on the display to create an impression that the virtual participant is present within the scene local to the user.

* * * * *